(12) United States Patent
Coget et al.

(10) Patent No.: US 10,549,549 B2
(45) Date of Patent: Feb. 4, 2020

(54) AQUEOUS INKJET INKS FOR INKJET PRINTING

(71) Applicant: Lamberti SPA, Albizzate (IT)

(72) Inventors: Karine Coget, Somma Lombardo (IT); Thomas Gallo, Busto Arsizio (IT); Simona Esposito, Gallarate (IT); Lorenza Mariani, S. Nicolo a Tordino (IT); Alan Nappa, Modena (IT); Giovanni Floridi, Novara (IT); Giuseppe Li Bassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 0 days.

(21) Appl. No.: 16/070,992

(22) PCT Filed: Jan. 16, 2017

(86) PCT No.: PCT/EP2017/050807
§ 371 (c)(1),
(2) Date: Jul. 18, 2018

(87) PCT Pub. No.: WO2017/125353
PCT Pub. Date: Jul. 27, 2017

(65) Prior Publication Data
US 2019/0016908 A1 Jan. 17, 2019

(30) Foreign Application Priority Data
Jan. 18, 2016 (IT) ............... UB2016A0513

(51) Int. Cl.
| | | |
|---|---|---|
| B41J 3/407 | (2006.01) | |
| C09D 11/322 | (2014.01) | |
| D06P 5/30 | (2006.01) | |
| C08G 18/48 | (2006.01) | |
| C08G 18/66 | (2006.01) | |
| C08G 18/73 | (2006.01) | |
| C08G 18/75 | (2006.01) | |
| C08G 18/08 | (2006.01) | |
| C08G 18/34 | (2006.01) | |
| C08G 18/42 | (2006.01) | |
| D06P 1/52 | (2006.01) | |
| D06P 1/44 | (2006.01) | |
| B41J 2/21 | (2006.01) | |
| C09D 11/102 | (2014.01) | |
| C09D 11/324 | (2014.01) | |

(52) U.S. Cl.
CPC .......... B41J 3/4078 (2013.01); B41J 2/2107 (2013.01); C08G 18/0823 (2013.01); C08G 18/348 (2013.01); C08G 18/4238 (2013.01); C08G 18/4277 (2013.01); C08G 18/4854 (2013.01); C08G 18/6659 (2013.01); C08G 18/6692 (2013.01); C08G 18/73 (2013.01); C08G 18/755 (2013.01); C09D 11/102 (2013.01); C09D 11/322 (2013.01); C09D 11/324 (2013.01); D06P 1/44 (2013.01); D06P 1/5285 (2013.01); D06P 5/30 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 4,123,423 A | 10/1978 | Wenzel | |
| 9,499,704 B2 * | 11/2016 | Okamura | ............... B41J 2/2107 |
| 10,150,881 B2 * | 12/2018 | Yamazaki | ............. B41J 11/002 |
| 2009/0226679 A1 * | 9/2009 | Yatake | ................. C09D 11/322 |
| | | | 428/195.1 |
| 2012/0306976 A1 * | 12/2012 | Kitagawa | ............. C09D 11/326 |
| | | | 347/100 |

FOREIGN PATENT DOCUMENTS

| | | |
|---|---|---|
| CN | 102978943 A | 3/2013 |
| WO | 20130963440 A1 | 6/2013 |

OTHER PUBLICATIONS

Patent Cooperation Treaty International Search Report; PCT/EP2017/050807; dated Mar. 2, 2017.
Patent Cooperation Treaty Written Opinion of the International Searching Authority; PCT/EP2017/050807; dated Mar. 2, 2017.

* cited by examiner

*Primary Examiner* — Manish S Shah
(74) *Attorney, Agent, or Firm* — Elisabeth Rather Healey; Vorys, Sater, Seymour and Pease LLP

(57) ABSTRACT

Aqueous inkjet ink for textile inkjet printing comprising dispersed pigments and a binder which is a carboxylated polyurethane having blocked isocyanate groups and method for using the same.

20 Claims, No Drawings

AQUEOUS INKJET INKS FOR INKJET PRINTING

This application is a National Stage Entry under 35 U.S.C. § 371 of PCT/EP2017/050807, filed on Jan. 16, 2017, the entire content of this international application is hereby expressly incorporated by reference herein.

FIELD OF THE INVENTION

The present invention relates to aqueous inkjet inks that are especially suitable for textile inkjet printing. The aqueous inkjet inks comprise dispersed pigments and a binder which is a carboxylated polyurethane having a controlled number of blocked isocyanate groups that undergo de-blocking upon post-printing heat treatment.

BACKGROUND OF THE ART

Aqueous inks for textile printing may comprise dispersed pigments (pigment inks) or water soluble dyes.

Pigments offer several advantages over water soluble dyes, mainly because they are not fiber dependent, they limit the formation of waste water and they usually have greater light and water resistance and better colour yield. As a consequence, the use of pigments is the major colouration method in conventional textile screen printing.

On the other hand, in the newly developed inkjet textile printing, the volume of pigmented inks do not exceed the two percent of the total market.

The reasons of this are to be found in the serious technical obstacles that are met to obtain pigment inks that satisfy both the colour rendering and fastness performances and the chemical-physical requirements that are necessary for the working mechanism of inkjet printing machines.

The selection of a proper binder to fix the pigment particles to the substrate is one of the main problems encountered in the formulation of textile inkjet pigment inks.

While colour rendering of the inkjet inks is mostly dependent about the quality and concentration of the pigments, fastness performances are generally governed by the binder; the choice of a binder is also critical because of its tendency to film or produce solid deposits within the inkjet printing machine, which is highly undesirable.

A certain amount of pigment is necessary for a good colour rendering. while a related amount of binder is necessary to appropriately fix the pigment to the fiber and to have good fastness.

However, the addition of pigments and chemical additives to the ink, like the binder, may increase the viscosity of the ink to the extent that it becomes difficult to jet the ink from the small orifices in an inkjet print head. Therefore a pigment ink with a high colour level typically contains less binder and thus has lower wash fastness. On the other hand, pigmented inks with good wash fastness typically do not satisfy colour rendering requirements.

In addition, ink jet printing using pigmented inks suffers the problems of clogging in the fine nozzle of inkjet printing head and the possible occurrence of time related precipitation and flocculation of the pigment in the ink. Other problems include the possibility of film formation on the nozzle tip of ink jet printing head due to the filming of the binder during processing with the consequent nozzle clogging.

Many binder for pigment inkjet inks for textiles have been described in the patent literature, by way of example in WO 2005/113692, US 2013/0196124 and US 2015/0159031.

WO 2005/113692 discloses an inkjet ink that includes a binder comprising a polyether polyurethane polymer. The binder has groups of the formula —NH—CO—$X^n$—, where X is an anionic water solubilising group, typically $SO_3^-$, n is 1, 2 or 3. These groups are also referred to as a bisulphite adducts and are known from U.S. Pat. No. 3,898,197 to be pH dependent blocked isocyanates.

US 2013/0196124 describes an aqueous ink jet ink useful for printing on wide format substrates and textiles that includes urethane polymers or prepolymer dispersion in water. The examples presented to illustrate the invention include anionic urethane polymers obtained by extending —NCO terminated prepolymers with diamines.

US 2015/0159031 discloses aqueous ink jet inks comprising a urethane resin as binder having a unit derived from a polyether polyol and wherein the molar ratio of urethane bonds/urea bonds is 80.0/20.0 or more.

Despite the technical solutions offered by the above patent applications, there is still a need for a binder that is able to provide an aqueous low viscosity inkjet ink composition, suitable for textile printing, that satisfies the colour rendering and fastness requirements and fulfils the chemical and physical requirements of low viscosity print heads, that, at present, typically require inks with viscosity below 6 mPa·s.

The inventors have now found that the above objectives are achieved by a binder which is a specific blocked carboxylated polyurethane that is activatable (de-blockable) after printing by a heat treatment at conventional temperatures.

The useful blocked carboxylated polyurethane is prepared by reacting aliphatic or cycloaliphatic diisocyanates with diols, at least one of which comprising a carboxylic acid group, in a specific molar ratio, and blocking all, or a portion, of the —NCO groups with thermally de-blockable blocking agents.

Advantageously, the use of the binder according to the invention does not require the co-presence in the inkjet ink of crosslinking agents or of an additional film forming polymeric agent.

The aqueous inkjet pigment inks that comprise the above binder have low viscosity and long shelf life; they are suitable to be printed on various textiles and to be passed through a conventional heating treatment at about 120-170° C. to form a permanent protective film.

SUMMARY OF THE INVENTION

In one aspect, the invention is an aqueous inkjet ink comprising dispersed pigments and a binder which is a carboxylated polyurethane having blocked isocyanate groups obtained by a process comprising the following steps:
  a. reacting
  i) at least one aliphatic or cycloaliphatic diisocyanate,
  ii) at least one diol having molecular weight from 500 to 5,000 daltons selected in the group consisting of polyether diols, polyester diols, polycarbonate diols, polyesteramide diols, polythioether diols, polyacetal diols, polyvinyl diols, polysiloxane diols,
  iii) at least one diol having a carboxylic acid group,
  the ratio between the —NCO groups of the diisocyanate and the OH groups of the diol being between 1.2 and 2, to form a —NCO terminated intermediate;

b. reacting the —NCO terminated intermediate with one or more —NCO blocking agent selected in the group consisting of triazoles, pyrazoles, oximes and lactames and, optionally, with a monofunctional alcohol or with a primary or secondary monoamine or with a mixture thereof, to obtain a carboxylated polyurethane having blocked isocyanate groups;

c. optionally dispersing the carboxylated polyurethane having blocked isocyanate groups in water at concentration between 15 and 60% by weight.

In another aspect the invention is a method for printing textiles by inkjet printing that comprises the following steps:

i. one or more of the aqueous inkjet inks of the invention, described here above, are jetted onto a textile substrate by a inkjet printer;

ii. the textile substrate is heated at temperatures from 120° C. to 170° C. for 1-10 minutes.

DESCRIPTION OF THE INVENTION

The carboxylated polyurethane having blocked isocyanate groups that is contained in the aqueous inkjet inks is obtained by the process described by the specific steps from a. to b. and optionally c.

Examples of aliphatic or cycloaliphatic diisocyanate that can be used in step a. are 1,6-hexamethylene diisocyanate (HDI), isophorone diisocyanate (IPDI), 4,4'-dicyclohexylmethane diisocyanate (HMDI), 2-methyl pentane 1,5-diisocyanate, hydrogenated 2,4-toluene diisocyanate, hydrogenated 2,6-toluene diisocyanate, 3(4)-isocyanatomethyl-1-methyl cyclohexyl isocyanate (IMCI) and mixtures thereof.

The preferred aliphatic or cycloaliphatic diisocyanates are 1,6-hexamethylene diisocyanate, isophorone diisocyanate, 4,4'-dicyclohexylmethane diisocyanate.

The most preferred diisocyanates are 1,6-hexamethylene diisocyanate and isophorone diisocyanate.

In step a., the aliphatic or cycloaliphatic diisocyanates are reacted with at least one diol ii) selected in the group consisting of polyether diols, polyester diols, polycarbonate diols, polyesteramide diols, polythioether diols, polyacetal diols, polyvinyl diols and polysiloxane diols.

The diol ii) has molecular weight (MW) from 500 to 5,000 daltons, preferably from 500 to 2,000 daltons, as determined from the hydroxyl number of the diol.

Preferably, in step a., the aliphatic or cycloaliphatic diisocyanates are reacted with at least one diol ii) selected in the group consisting of polyether diols, polyester diols and polycarbonate diols, more preferably with at least one diol ii) selected in the group consisting of polyether diols and polyester diols; most preferably the diol ii) is a polyester diol having molecular weight from 500 to 5,000 daltons.

Useful polyether diols include products obtained by the polymerisation of cyclic oxides, for example ethylene oxide, propylene oxide, butylene oxide, tetrahydrofuran, and mixture thereof. Especially useful polyether diols include polyoxypropylene diol, poly(oxyethylene-oxypropylene) diol and poly(tetramethylene glycol). The preferred polyether diol is poly(tetramethylene glycol).

The polycarbonate diols are those obtained, for example, by reacting carbonic acid derivatives, such as diphenyl carbonate or phosgene, and diols.

Suitable diols include ethylene glycol, 1,2- and 1,3-propanediol, 1,3- and 1,4-butanediol, 1,6-hexanediol, 3-methyl-1,5-pentanediol, 1,5-pentanediol, cyclohexanedimethanol, diethylene glycol, dipropylene glycol, neopentyl glycol and mixtures thereof, such as mixtures of 1,6-hexanediol and 1,5-pentanediol or of 1,6-hexanediol and neopentyl glycol.

The preferred polycarbonate diol is 1,6-hexanediol polycarbonate.

The polyester diols are those obtained, for example, by reacting dicarboxylic acids, or possibly the corresponding anhydrides or methyl esters, with diols, optionally in the presence of known esterification catalysts.

Examples of suitable acids or anhydrides include adipic acid, succinic acid, maleic acid, sebacic acid, azelaic acids, the various commercially available dimeric fatty acids in saturated (hydrogenated) or unsaturated form, phthalic acid, isophthalic acid, tetrahydrophthalic acid, 1,4-cyclohexanedicarboxylic acid and hexahydrophthalic acid; adipic acid, succinic acid, maleic acid, sebacic acid and azelaic acids are preferred. Suitable diols for the preparation of the polyester diol are those mentioned above for the preparation of the polycarbonate diols.

Other useful polyester diols are those obtainable from diol initiated polymerization of hydroxy carboxylic acids containing from 2 to 26, and preferably from 4 to 12 carbon atoms, or a lactone thereof. The hydroxy carboxylic acids may be saturated or unsaturated, linear or branched. Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid. Examples of suitable lactones are β-propiolactone and, optionally $C_1$-$C_6$-alkyl substituted, δ-valerolactone and ε-caprolactone, such as β-methyl-δ-valerolactone.

Polyester diols obtained from ε-caprolactone are especially preferred. Suitable polyesteramide diols are those obtained by including one or more aminoalcohol in the above mentioned polyesterification mixtures.

The diols ii) are most preferably non-ionic and non-ionizable. Nonetheless, diols which incorporate carboxy groups, for example the polyester diol synthesised by esterification of dimethylolpropionic acid and/or dimethylolbutanoic acid with diols, may also be used.

The at least one diol having a carboxylic acid group (diol iii)) may be in acid form (undissociated —COOH) or in form of salt (dissociated —COO$^-$M$^+$). Advantageously, it is an aliphatic diol with molecular weight from 92 to about 300 daltons. The preferred diols iii) are dimethylol alkanoic acids, such as dimethylolpropionic acid (DMPA) and dimethylolbutanoic acid (DMBA), DMPA being the most preferred diol iii).

The diol iii) may be reacted in acid form or in the form of salt, for example in the form of trialkylammonium salt or alkali metal salt. Diols iii) that are partially dissociated and partially undissociated may be used in step a.

Preferably the diol iii) is reacted in its acid form and subsequently salified with a tertiary amine (such as triethylamine and dimethyl ethanol amine) or an inorganic alkali (such as KOH, NaOH and LiOH).

The amount of diol iii) is determined to provide water dispersibility of the carboxylated polyurethane which is obtained after completion of step b., according to what is well known in the art.

Typically, dispersibility is achieved by introducing an amount of diol iii) such that the intermediate product from step a. contains from 5 to 50 meq/100 g dry weight of carboxylic groups (as —COOH).

Beside the diols ii) and iii), other low molecular weight diols, here designated diols iv), can be used in step a., preferably in amount not exceeding 5% by weight of the sum of ii) and iii). By low molecular weight diols we mean diols having molecular weight below 500 daltons and especially from 62 to 300 daltons.

Examples of low molecular weight diols that can be used in step a. are 1,4-cyclohexanedimethanol, 1,2-propanediol, 1,3-propanediol, 1,2-ethanediol, 1,4-butanediol, 1,6-hexanediol, 2,2-dimethyl-1,3-propandiol, mixtures thereof.

In a preferred embodiment, the carboxylated polyurethane having blocked isocyanate groups is linear, being prepared from the reaction, in step a., of the difunctional compounds i) to iv) only, so that it is expected that the blocked isocyanate groups are in the terminal positions.

In a more preferred embodiment, the carboxylated polyurethane having blocked isocyanate groups is obtained by reacting, in step a, only the compounds listed under i), ii) and iii).

The reaction of step a. may take place in the presence of a solvent at temperatures from 15 to 200° C., preferably at temperatures from 15 to 50° C. The solvent shall be chosen among solvents which are not reactive toward the isocyanate groups.

Examples of solvents that can be used in step a. are solvents having low boiling point such as methyl ethyl ketone, ethyl acetate and acetone, or high boiling solvents such as N-methylpyrrolidone, dipropylene glycol dimethyl ether, propyleneglycol monomethyl ether acetate, dipropyleneglycol monomethyl ether acetate, propyleneglycol diacetate, diethyleneglycol monobutyl ether acetate. The low boiling solvent, if present, is preferably removed by evaporation after dispersion in water of the carboxylated polyurethane having blocked isocyanate groups obtained after step b.

The completion of the reaction of step a. may be monitored by repeatedly measuring the —NCO content, according to the ASTM D2572 method, until the expected —NCO content is reached.

In the reaction of step a. the ratio between the —NCO groups of the diisocyanate and the OH groups of the diols, which is between 1.2 and 2, preferably from 1.3 to 1.9, more preferably from 1.4 to 1.8, has revealed to be critical because it is responsible for the total amount of —NCO groups that remain available for the subsequent reaction of step b., during which a controlled, sufficient amount of the —NCO groups of the —NCO terminated intermediate ("intermediate") shall be reversibly blocked.

In the present text, by "the ratio between the —NCO groups of the diisocyanate and the OH groups of the diols" we mean the molar ratio between the —NCO groups of the diisocyanate and the OH groups of the diols.

In step b. preferably at least 40%, or at least 60%, of the —NCO groups of the intermediate are reacted with one or more —NCO blocking agent and, optionally, up to 60% of the —NCO groups of the intermediate are reacted with a monofunctional alcohol or with a primary or secondary monoamine or with a mixture thereof.

Therefore, another object of the invention is a carboxylated polyurethane having blocked isocyanate groups obtained by a process comprising the following steps:
 a. reacting
  i) at least one aliphatic or cycloaliphatic diisocyanate,
  ii) at least one diol having molecular weight from 500 to 5,000 daltons selected in the group consisting of polyether diols, polyester diols, polycarbonate diols, polyesteramide diols, polythioether diols, polyacetal diols, polyvinyl diols and polysiloxane diols,
  iii) at least one diol having a carboxylic acid group,
  the ratio between the —NCO groups of the diisocyanate and the OH groups of the diols being between 1.2 and 2, to form a —NCO terminated intermediate;
 b. reacting the —NCO terminated intermediate with one or more —NCO blocking agent selected in the group consisting of triazoles, pyrazoles, oximes and lactames and, optionally, with a monofunctional alcohol or with a primary or secondary monoamine or with a mixture thereof, to form a carboxylated polyurethane having blocked isocyanate groups;
 c. optionally dispersing the carboxylated polyurethane having blocked isocyanate groups in water at concentration between 15 and 60% by weight
 provided that in step b. at least 40% of the —NCO groups of the —NCO terminated intermediate product are reacted with the blocking agent and up to 60% of the —NCO groups of the —NCO terminated intermediate product are reacted with a monofunctional alcohol or with a primary or secondary monoamine or with a mixture thereof.

Moreover, advantageously, at least 70%, or even at least 80%, of the —NCO groups of the intermediate are reacted with the blocking agent or they are reacted both with the blocking agent and the monofunctional alcohol, the primary or secondary monoamine or the mixture thereof, so that no more than 30%, or than 20%, of the —NCO groups of the intermediate remain available to react with water. This feature guarantees that the carboxylated polyurethane from step b. undergoes controlled extension in water during step c., or in the aqueous medium of the inkjet inks, to provide storage stability of the ink, washability of the final carboxylated polyurethane from the printing machine (especially from the printing head) and proper colour fastness of the printed ink.

Most advantageously, about 100% of the —NCO groups of the —NCO terminated intermediate are reacted with the blocking agent or they are reacted both with the blocking agent and the monofunctional alcohol, the primary or secondary monoamine or the mixture thereof, so that no —NCO groups of the intermediate are left unreacted and available to react with water after step b.

The blocking agents that can be used are selected in the group consisting of triazoles, pyrazoles, oximes, lactames and mixture thereof.

Triazoles, pyrazoles, oximes and lactames undergo de-blocking at high temperatures, typically at temperatures higher than 100° C., and in the present text, they are all considered reversible blocking agents, being able to re-generate —NCO groups upon heating.

The preferred blocking agents are pyrazoles and oximes, and especially 3,5-dimethyl pyrazole and methyl ethyl ketoxime (2-butanone oxime), or a mixture thereof, that possess a particularly suitable de-blocking temperature when reacted with aliphatic or cycloaliphatic isocyanates. Actually, in such conditions, pyrazoles and oximes undergo rapid de-blocking at temperatures from about 120 to about 170° C., that are reached during the conventional drying step of printed textile substrates.

The most preferred blocking agents are pyrazoles and in particular 3,5-dimethyl pyrazole.

In step b., one or more monofunctional alcohol, primary or secondary monoamine, or mixtures thereof, may react with some of the —NCO groups of the —NCO terminated intermediate.

Typically, the monofunctional alcohol is a (cyclo)aliphatic (i.e. cycloaliphatic or aliphatic) $C_1$-$C_8$, linear or branched, monoalcohol and the primary or secondary monoamine is a (cyclo)aliphatic $C_1$-$C_8$, linear or branched, monoamine, possibly hydroxyl substituted.

The (cyclo)aliphatic $C_1$-$C_8$, linear or branched, monoalcohol may be chosen, by way of example, among isopropanol, butyl alcohol, 1-hexanol, 2-ethyl-1-hexanol.

The (cyclo)aliphatic $C_1$-$C_8$, linear or branched, primary or secondary monoamine may be chosen, by way of example, among dibutylamine, diisopropylamine and diethanolamine.

The carboxylated polyurethane having blocked isocyanate groups obtained from step b. is preferably dispersed in water in step c.

In the preferred embodiment, where in step b. all the —NCO groups of the —NCO terminated intermediate are reacted with the blocking agent, or they are all reacted with both the blocking agent and the monofunctional alcohol, the primary or secondary monoamine or the mixture thereof, so that at least 40% of the —NCO groups are blocked and no —NCO groups are available for reaction with water, in step c. no reaction takes place, and the carboxylated polyurethane having blocked isocyanate groups is just physically dispersed in water.

In other embodiments, where in step b. a controlled portion of the —NCO groups of the —NCO terminated intermediate are left unreacted, they do react with water in step c., thus slightly increasing the molecular weight of the final product, which is a carboxylated polyurethane having blocked isocyanate groups dispersed in water; most preferably, the water in which the carboxylated polyurethane having blocked isocyanate groups is dispersed does not contain any primary or secondary diamines that would compete with water in the partial extension of the carboxylated polyurethane having blocked isocyanate groups (at least until all the —NCO groups have reacted).

The carboxylated polyurethane having blocked isocyanate groups obtained after step b. or after step c. is used as the binder component of aqueous inkjet inks that can be used for textile inkjet printing. Advantageously, it does not require the co-presence of crosslinking agents or of an additional film forming polymeric agent in the ink, being perfectly suitable to provide colour fastness and, at the same time, to avoid clogging of the nozzles and depositing of persistent films or solids on the operating parts of the printing machine, while running and after use. Therefore, the inkjet inks of the invention are preferably devoid of crosslinking agents, i.e. of chemicals bearing reactive groups at ambient and application temperature, and of film forming polymers. i.e. of polymers that are capable of forming a continuous (transparent and crack-free) film.

The aqueous inkjet ink of the present invention further comprises at least one dispersed pigment, that may be organic or inorganic, typically in an amount from 2 to 10% by weight.

Preferably the dispersed pigment is an organic pigment and/or carbon black.

By dispersed pigments, we mean pigments that are dispersed in the ink by mean of a conventional dispersing agent and self-dispersible pigments, in which stabilizing groups are attached to pigments surface to guarantee proper dispersion and colloidal stability.

Any of the recognized classes of pigments that can be used in textile printing may be used in the inkjet inks of the invention.

In particular, examples of organic pigments that can be used in this embodiment include, but are not limited to, quinacridone pigments, quinacridone quinone pigments, dioxazine pigments, phthalocyanine pigments, anthrapyrimidine pigments, anthanthrone pigments, indanthrone pigments, isoindanthrone pigments, isodibenzanthrone pigments, triphendioxazine pigments, diketopyrrolopyrrol pigments, flavanthrone pigments, perylene pigments, perinone pigments, quinophthalone pigments, anthraquinone pigments, thioindigo pigments, benzimidazolone pigments, isoindolinone pigments, azomethine pigments, azo pigments and mixtures thereof.

Specific examples of organic pigments that can be used are C. I. Pigment Yellow 1, C. I. Pigment Yellow 3, C. I. Pigment Yellow 12, C. I. Pigment Yellow 13, C. I. Pigment Yellow 14, C. I. Pigment Yellow 65, C. I. Pigment Yellow 74, C. I. Pigment Yellow 81, C. I. Pigment Yellow 83, C. I. Pigment Orange 13, C. I. Pigment Orange 16, C. I. Pigment Orange 34, C. I. Pigment Red 3, C. I. Pigment Red 8, C. I. Pigment Red 21, C. I. Pigment Red 7, C. I. Pigment Red 23, C. I. Pigment Red 38, C. I. Pigment Red 48:2, C. I. Pigment Red 48:4, C. I. Pigment Red 49:1, C. I. Pigment Red 52:2, C. I. Pigment Red 57:1, C. I. Pigment Red 63:1, C. I. Pigment Red 64:1, C. I. Pigment Red 81, C. I. Pigment Red 88, C. I. Pigment Red 92, C. I. Pigment Red 112, C. I. Pigment Red 122, C. I. Pigment Red 123, C. I. Pigment Red 146, C. I. Pigment Red 149, C. I. Pigment Red 166, C. I. Pigment Red 168, C. I. Pigment Red 170, C. I. Pigment Red 172, C. I. Pigment Red 185, C. I. Pigment Red 190, C. I. Pigment Red 209, C. I. Pigment Blue 1, C. I. Pigment Blue 15:1, C. I. Pigment Blue 15:3, C. I. Pigment Blue 15:4, C. I. Pigment Blue 15:6, C. I. Pigment Blue 16, C. I. Pigment Blue 17:1, C. I. Pigment Blue 56, C. I. Pigment Blue 61, C. I. Pigment Blue 63, C. I. Pigment Violet 19 and mixtures thereof.

The pigments of the inkjet ink of the present invention preferably have $d_{90}$ of less than 300 nm, as measured by laser diffraction particle size analysis according to standard method ISO 13320-2009.

Typically, in the inkjet inks of the invention the weight ratio between the binder and the pigments is comprised between 0.3 and 3, preferably between 0.5 and 2, more preferably between 1 and 1.5.

The aqueous inkjet pigment inks of the invention, that comprise the above binder and one or more pigments, typically have low viscosity, i.e. viscosity from 3 to 15 mPa·s, preferably from 3 to 10 mPa·s, and more preferably from 3 to 6 mPa·s, as measured with a concentric cylinder rheometer at 25° C. and they show Newtonian behaviour.

Moreover, they possess good shelf life, being stable at 50° C. for at least 14 days. By stable, we mean that no sediment formation is visually observed during storage, or that a sediment is formed but it can be re-dispersed immediately by stirring.

They are suitable to be printed on various textiles and to be passed through a conventional drying heat treatment at about 120-170° C., that activates the binder in few minutes, typically in 1-10 minutes, and makes it form a permanent protective film on the pigments that guarantees colour fastness and washing resistance.

In particular, the inkjet inks are suitable to be printed on cotton, rayon viscose, polyester and polyamide textiles.

The aqueous inkjet ink may additionally comprise up to 40% by weight of an organic water miscible co-solvent, such as glycols or glycol ethers, and other additives, such as wetting agents, preservatives, pH regulators, antifoams, dispersing agents, and other additives that are conventional in the art.

The content of water in the ink is typically from 50 to 90% by weight based on the total weight of the ink.

The inkjet ink of the invention is usually prepared by mixing a mill base (i.e. an aqueous concentrated dispersion of the pigment), water, optionally the water miscible solvent and the binder, possibly dispersed in water.

The mill base may be a commercially available concentrated dispersion of a pigment, or may be prepared in loco, by milling a commercial pigment in a mill, usually a horizontal bead mill, in the presence of water, dispersant, and usually defoamer, water miscible solvent and preservative.

The invention is further related to a method for printing textiles by inkjet printing. The method comprises preparing one or more aqueous inkjet inks by dispersing at least one pigment and the carboxylated polyurethane having blocked isocyanate groups described above in an aqueous medium; jetting the one or more ink onto a textile substrate by an inkjet printer; heating the textile substrate at temperatured from 120° C. to 170° C. for from 1 to 10 minutes, preferably at 140-165° C. for 2-6 minutes.

The inkjet printer may indifferently be a continuous inkjet printer or a drop-on-demand inkjet printer.

The invention is further illustrated by the following examples.

EXAMPLES

Preparation of the Binders

Example 1

175.3 g (175.3 mmol) of CAPA 2100, a polycaprolactone diol with functionality 2.0 and MW about 1,000 from Perstorp (SE), and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 74.0 g (440.4 mmol) of hexamethylene diisocyanate are added under stirring.

The reaction mixture is heated to 60° C. and, after 30 minutes, to 80° C.

The reaction is carried out at 80° C. until the content of NCO groups is constantly 5.28% (the content of isocyanate groups has been determined in this and all the other examples according to the standard test method ASTM D2572).

105.1 g of acetone are added to the mixture, cooling simultaneously below 40° C.; at the end of the addition a clear mixture is obtained.

3.34 g (33.0 mmol) of diisopropylamine are dropped into the mixture.

28.54 g (297.3 mmol) of 3,5-dimethylpirazole are added to the mixture. The temperature of the mixture increases by 9° C. After about 40 minutes, all NCO groups have reacted.

The disappearance of free NCO groups is detected by IR analysis of the mixture (in particular with the disappearance of IR band at wave number 2260-2280 $cm^{-1}$).

187.4 g of a mixture made of 9.1 g (101.7 mmol) of 2-dimethylaminoethanol, 3.0 g of Rolfen 10/12/490A (a surfactant from Lamberti SpA) and 175.3 g of water are added to the mixture, under stirring, in about 15 minutes.

492.6 g of water are added to the mixture in about 10 minutes and an opalescent dispersion is obtained. Acetone is removed by evaporation.

At the end of the acetone removal, 13.45 g of a 33 wt % solution of sodium salt of N-(2-aminoethyl)-2-aminoethane sulphonic acid (stabiliser) and 11.8 g of a 10 wt % solution of Acticide LA (preservative from Thor Industries Inc.) are added to the waterborne dispersion.

Example 2 (Comparative)

167.2 g (167.2 mmol) of CAPA 2100 and 12.8 g (95.4 mmol) of dimethylolpropionic acid are loaded in a reactor equipped with thermometer, stirrer and condenser, under nitrogen atmosphere.

0.01 g of a 85.0 wt % solution of phosphoric acid and 0.14 g of benzoyl chloride are added to the reactor.

At 40° C., 70.6 g (420.0 mmol) of hexamethylene diisocyanate are added under stirring.

The reaction mixture is heated to 60° C. and, after 30 minutes, to 80° C.

The reaction is carried out at 80° C., until the content of NCO groups is constantly 5.28%.

100.2 g of acetone are added to the mixture, cooling simultaneously below 40° C.; at the end of the addition a clear mixture is obtained.

40.72 g (315.0 mmol) of dibutylamine are dropped into the mixture.

The temperature of the mixture increases by 10° C. After about 5 minutes, all NCO groups have reacted.

The disappearance of NCO groups is detected by IR analysis of the mixture, as in Example 1.

185.1 g of a mixture made of 8.7 g (97.3 mmol) of 2-dimethylaminoethanol, 3.0 g of Rolfen 10/12/490A and 173.4 g of water are added to the mixture, under stirring, in about 15 minutes.

498.2 g of water are added to the mixture in about 10 minutes and an opalescent dispersion is obtained. Acetone is removed by evaporation.

At the end of the acetone removal, 13.45 g of a 33 wt % solution of sodium salt of N-(2-aminoethyl)-2-aminoethane sulphonic acid and 11.8 g of a 10 wt % solution of Acticide LA are added to the waterborne dispersion.

Example 3

169.2 g (169.2 mmol) of CAPA 2100 and 13.4 g (99.6 mmol) of dimethylolpropionic acid are loaded in a reactor equipped with thermometer, stirrer and condenser, under nitrogen atmosphere.

0.01 g of a 85.0 wt % solution of phosphoric acid and 0.14 g of benzoyl chloride are added to the reactor.

At 40° C., 72.3 g (430.2 mmol) of hexamethylene diisocyanate are added under stirring.

The reaction mixture is heated to 60° C. and, after 30 minutes, to 80° C.

The reaction is carried out at 80° C., until the content of NCO groups is constantly 5.32%.

101.5 g of acetone are added to the mixture, cooling simultaneously below 40° C.; at the end of the addition a clear mixture is obtained.

20.85 g (161.3 mmol) of dibutylamine are dropped into the mixture. The temperature of the mixture increases by 5° C.

15.51 g (161.3 mmol) of 3,5-dimethylpirazole are added to the mixture. The temperature of the mixture increases by 6° C. After about 40 minutes, all NCO groups have reacted.

The disappearance of NCO groups is detected by IR analysis of the mixture, as in Example 1.

187.2 g of a mixture made of 9.0 g (101.3 mmol) of 2-dimethylaminoethanol, 3.0 g of Rolfen 10/12/490A and 175.2 g of water are added to the mixture, under stirring, in about 15 minutes.

496.1 g of water are added to the mixture in about 10 minutes and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 4

171.9 g (171.9 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.14 g of benzoyl chloride are added to the reactor.

At 40° C., 73.1 g (435.0 mmol) of hexamethylene diisocyanate are added under stirring.

The reaction mixture is heated to 60° C. and, after 30 minutes, to 80° C.

The reaction is carried out at 80° C., until the content of NCO groups is constantly 5.30%.

101.2 g of acetone are added to the mixture, cooling simultaneously below 40° C.; at the end of the addition a clear mixture is obtained.

17.15 g (163.1 mmol) of diethanolamine are dropped into the mixture. The temperature of the mixture increases by 6° C.

15.68 g (163.1 mmol) of 3,5-dimethylpirazole are added to the mixture. The temperature of the mixture increases by 2° C. After about 40 minutes, all NCO groups reacted.

The disappearance of NCO groups is detected by IR analysis of the mixture, as in Example 1.

187.4 g of a mixture made of 9.1 g (101.6 mmol) of 2-dimethylaminoethanol, 3.0 g of Rolfen 10/12/490A and 175.3 g of water are added to the mixture, under stirring, in about 15 minutes.

495.9 g of water are added to the mixture in about 10 minutes and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 5

197.8 g (197.8 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.16 g of benzoyl chloride are added to the reactor.

At 40° C., 80.0 g (476.4 mmol) of hexamethylene diisocyanate are added under stirring.

The reaction mixture is heated to 60° C. and, after 30 minutes, to 80° C.

The reaction is carried out at 80° C., until the content of NCO groups is constantly 5.15%.

116.4 g of acetone are added to the mixture, cooling simultaneously below 40° C.; at the end of the addition a clear mixture is obtained.

15.56 g (178.7 mmol) of 2-butanone oxime are dropped into the mixture. The temperature of the mixture increases by 4° C.

17.17 g (178.7 mmol) of 3,5-dimethylpirazole are added to the mixture. The temperature of the mixture increases by 6° C. After about 40 minutes, all NCO groups are reacted.

The disappearance of NCO groups is detected by IR analysis of the mixture, as in Example 1.

187.4 g of a mixture made of 9.1 g (101.6 mmol) of 2-dimethylaminoethanol, 3.0 g of Rolfen 10/12/490A and 175.3 g of water are added to the mixture, under stirring, in about 15 minutes.

463.2 g of water are added to the mixture in about 10 minutes, and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 6

177.4 g (177.4 mmol) of CAPA 2100 and 12.6 g (93.7 mmol) of dimethylolpropionic acid are loaded in a reactor equipped with thermometer, stirrer and condenser, under nitrogen atmosphere.

0.01 g of a 85.0 wt % solution of phosphoric acid and 0.14 g of benzoyl chloride are added to the reactor.

At 40° C., 72.9 g (433.9 mmol) of hexamethylene diisocyanate are added under stirring.

The reaction mixture is heated to 60° C. and, after 30 minutes, to 80° C.

The reaction is carried out at 80° C., until the content of NCO groups is constantly 5.20%.

106.4 g of acetone are added to the mixture, cooling simultaneously below 40° C.; at the end of the addition a clear mixture is obtained.

28.35 g (325.4 mmol) of 2-butanone oxime are dropped into the mixture. The temperature of the mixture increases by 2° C.

After about 5 minutes all NCO groups have reacted.

The disappearance of NCO groups is detected by IR analysis of the mixture, as in Example 1.

184.3 g of a mixture made of 8.5 g (98.0 mmol) of 2-dimethylaminoethanol, 3.0 g of Rolfen 10/12/490A and 172.7 g of water are added to the mixture, under stirring, in about 15 minutes.

499.0 g of water are added to the mixture in about 10 minutes and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 7

162.2 g (162.2 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.16 g of benzoyl chloride are added to the reactor.

At 40° C., 79.3 g (472.0 mmol) of hexamethylene diisocyanate are added under stirring.

The reaction mixture is heated to 60° C. and, after 30 minutes, to 80° C.

The reaction is carried out at 80° C., until the content of NCO groups is constantly 6.91%.

102.3 g of acetone are added to the mixture, cooling simultaneously below 40° C.; at the end of the addition a clear mixture is obtained.

4.25 g (42.0 mmol) of diisopropylamine are dropped into the mixture.

36.30 g (377.6 mmol) of 3,5-dimethylpirazole are added to the mixture. The temperature of the mixture increases by 8° C. After about 40 minutes, all NCO groups reacted.

The disappearance of NCO groups is detected by IR analysis of the mixture, as in Example 1.

187.4 g of a mixture made of 9.1 g (101.7 mmol) of 2-dimethylaminoethanol, 3.0 g of Rolfen 10/12/490A and 175.3 g of water are added to the mixture, under stirring, in about 15 minutes.

491.7 g of water are added to the mixture in about 10 minutes and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 8

189.6 g (189.6 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 68.1 g (405.5 mmol) of hexamethylene diisocyanate are added under stirring.

The reaction mixture is heated to 60° C. and, after 30 minutes, to 80° C.

The reaction is carried out at 80° C., until the content of NCO groups is constantly 3.59%.

108.7 g of acetone are added to the mixture, cooling simultaneously below 40° C.; at the end of the addition a clear mixture is obtained.

2.34 g (23.2 mmol) of diisopropylamine are dropped into the mixture.

20.05 g (208.5 mmol) of 3,5-dimethylpirazole are added to the mixture. The temperature of the mixture increases by 5° C. After about 40 minutes, all NCO groups reacted.

The disappearance of NCO groups is detected by IR analysis of the mixture, as in Example 1.

187.4 g of a mixture made of 9.1 g (101.7 mmol) of 2-dimethylaminoethanol, 3.0 g of Rolfen 10/12/490A and 175.3 g of water are added to the mixture, under stirring, in about 15 minutes.

493.6 g of water are added to the mixture in about 10 minutes, and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 9 (Comparative)

205.9 g (205.9 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 71.9 g (428.2 mmol) of hexamethylene diisocyanate are added under stirring.

The reaction mixture is heated to 60° C. and, after 30 minutes, to 80° C.

The reaction is carried out at 80° C., until the content of NCO groups is constantly 3.53%.

116.3 g of acetone are added to the mixture, cooling simultaneously below 40° C.; at the end of the addition a clear mixture is obtained.

187.4 g of a mixture made of 9.1 g (101.7 mmol) of 2-dimethylaminoethanol, 3.0 g of Rolfen 10/12/490A and 175.3 g of water, are added to the mixture, under stirring, in about 15 minutes.

495.9 g of water are added to the mixture in about 10 minutes and a opalescent dispersion is obtained. Acetone is removed by evaporation.

At the end of acetone removal the disappearance of NCO groups is detected by IR analysis of the mixture, as in Example 1.

13.45 g of sodium salt of a 33 wt % solution of N-(2-aminoethyl)-2-aminoethane sulphonic acid and then 11.8 g of a 10 wt % solution of Acticide LA are added to the waterborne dispersion.

Example 10

177.6 g (177.6 mmol) of CAPA 2100 and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 74.6 g (444.1 mmol) of hexamethylene diisocyanate are added under stirring.

The reaction mixture is heated to 60° C. and, after 30 minutes, to 80° C.

The reaction is carried out at 80° C., until the content of NCO groups is constantly 5.27%.

106.5 g of acetone are added to the mixture, cooling simultaneously below 40° C.; at the end of the addition a clear mixture is obtained.

25.62 g (266.5 mmol) of 3,5-dimethylpirazole are added to the mixture. The temperature of the mixture increases by 8° C. After about 40 minutes, the content of NCO groups is constantly 0.70%.

187.4 g of a mixture made of 9.1 g (101.7 mmol) of 2-dimethylaminoethanol, 3.0 g of Rolfen 10/12/490A and 175.3 g of water are added to the mixture, under stirring, in about 15 minutes.

495.9 g of water are added to the mixture in about 10 minutes, and an opalescent dispersion is obtained. Acetone is removed by evaporation.

At the end of the acetone removal all NCO groups have disappeared; 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 11

175.3 g (175.3 mmol) of poly(tetramethylene ether) glycol with functionality 2.0 and MW about 1,000 and 13.3 g (98.9 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 73.2 g (435.4 mmol) of hexamethylene diisocyanate are added under stirring.

The reaction mixture is heated to 60° C. and, after 30 minutes, to 80° C.

The reaction is carried out at 80° C., until the content of NCO groups is constantly 5.28%.

103.9 g of acetone are added to the mixture, cooling simultaneously below 40° C.; at the end of the addition a clear mixture is obtained.

3.30 g (32.7 mmol) of diisopropylamine are dropped into the mixture.

28.25 g (293.9 mmol) of 3,5-dimethylpirazole are added to the mixture. The temperature of the mixture increases by 9° C. After about 40 minutes, all NCO groups are reacted.

The disappearance of NCO groups is detected by IR analysis of the mixture, as in Example 1.

186.8 g of a mixture made of 9.0 g (100.6 mmol) of 2-dimethylaminoethanol, 3.0 g of Rolfen 10/12/490A and 174.8 g of water are added to the mixture, under stirring, in about 15 minutes.

497.0 g of water are added to the mixture in about 10 minutes and an opalescent dispersion is obtained. Acetone is removed by evaporation.

At the end of the acetone removal, 13.45 g of sodium salt of a 33 wt % solution of N-(2-aminoethyl)-2-aminoethane sulphonic acid and 11.8 g of a 10 wt % solution of Acticide LA are added to the waterborne dispersion.

Example 12

159.4 g (159.4 mmol) of poly(tetramethylene ether) glycol with functionality 2.0 and MW about 1,000 and 13.3 g (98.9 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 91.8 g (413.2 mmol) of isophorone diisocyanate are added under stirring.

The reaction mixture is heated to 60° C. and, after 30 minutes, to 80° C.

The reaction is carried out at 80° C., until the content of NCO groups is constantly 4.92%.

104.7 g of acetone are added to the mixture, cooling simultaneously below 40° C.; at the end of the addition a clear mixture is obtained.

3.14 g (31.0 mmol) of diisopropylamine are dropped into the mixture.

26.81 g (278.9 mmol) of 3,5-dimethylpirazole are added to the mixture. The temperature of the mixture increases by 8° C. After about 40 minutes, all NCO groups are reacted.

The disappearance of NCO groups is detected by IR analysis of the mixture, as in Example 1.

186.8 g of a mixture made of 9.0 g (100.6 mmol) of 2-dimethylaminoethanol, 3.0 g of Rolfen 10/12/490A and 174.9 g of water are added to the mixture, under stirring, in about 15 minutes.

493.8 g of water are added to the mixture in about 10 minutes and a opalescent dispersion is obtained. Acetone is removed by evaporation.

At the end of the acetone removal, 13.45 g of a 33 wt % solution of sodium salt of N-(2-aminoethyl)-2-aminoethane sulphonic acid and 11.8 g of a 10 wt % solution of Acticide LA are added to the waterborne dispersion.

Example 13

175.3 g (175.3 mmol) of REALKYD 10G10 from Arkema Group, a polyester diol from adipate, 1,6-hexanediol and neopentylglycol with functionality 2.0 and MW about 1,000, and 13.4 g (100.0 mmol) of dimethylolpropionic acid are loaded in a reactor equipped with thermometer, stirrer and condenser, under nitrogen atmosphere.

0.01 g of a 85.0 wt % solution of phosphoric acid and 0.15 g of benzoyl chloride are added to the reactor.

At 40° C., 74.0 g (440.4 mmol) of hexamethylene diisocyanate are added under stirring.

The reaction mixture is heated to 60° C. and, after 30 minutes, to 80° C.

The reaction is carried out at 80° C., until the content of NCO groups is constantly 5.28%.

105.1 g of acetone are added to the mixture, cooling simultaneously below 40° C.; at the end of the addition a clear mixture is obtained.

3.34 g (33.0 mmol) of diisopropylamine are dropped into the mixture.

28.54 g (297.3 mmol) of 3,5-dimethylpirazole are added to the mixture. The temperature of the mixture increases by 9° C.

After about 40 minutes, all NCO groups have reacted.

The disappearance of NCO groups is detected by IR analysis of the mixture as in Example 1.

187.4 g of a mixture made of 9.1 g (101.7 mmol) of 2-dimethylaminoethanol, 3.0 g of Rolfen 10/12/490A and 175.3 g of water are added to the mixture, under stirring, in about 15 minutes.

492.6 g of water are added to the mixture in about 10 minutes and an opalescent dispersion is obtained. Acetone is removed by evaporation.

At the end of the acetone removal, 13.45 g of sodium salt of a 33 wt % solution of sodium salt of N-(2-aminoethyl)-2-aminoethane sulphonic acid and 11.8 g of a 10 wt % solution of Acticide LA are added to the waterborne dispersion.

The relevant characteristics of the binders 1 to 13 are resumed in Table 1.

TABLE 1

| Ex. | dNCO | dOH | NCO/OH | BA | % NCOb | MR | % NCOr | % NCOf |
|---|---|---|---|---|---|---|---|---|
| 1 | HDI | CL | 1.6 | DMP | 90 | DIPA | 10 | 0 |
| 2* | HDI | CL | 1.6 | — | 0 | DBA | 100 | 0 |
| 3 | HDI | CL | 1.6 | DMP | 50 | DIPA | 50 | 0 |
| 4 | HDI | CL | 1.6 | DMP | 50 | DEA | 50 | 0 |
| 5 | HDI | CL | 1.6 | D/M | 100 | — | 0 | 0 |
| 6 | HDI | CL | 1.6 | MEKO | 100 | — | 0 | 0 |
| 7 | HDI | CL | 1.8 | DMP | 90 | DIPA | 10 | 0 |
| 8 | HDI | CL | 1.4 | DMP | 90 | DIPA | 10 | 0 |
| 9* | HDI | CL | 1.4 | — | 0 | — | 0 | 100 |
| 10 | HDI | CL | 1.4 | DMP | 80 | — | 0 | 20 |
| 11 | HDI | PTG | 1.6 | DMP | 90 | DIPA | 10 | 0 |

TABLE 1-continued

| Ex. | dNCO | dOH | NCO/OH | BA | % NCOb | MR | % NCOr | % NCOf |
|-----|------|-----|--------|-----|--------|------|--------|--------|
| 12  | IPDI | PTG | 1.6    | DMP | 90     | DIPA | 10     | 0      |
| 13  | HDI  | AHN | 1.6    | DMP | 90     | DIPA | 10     | 0      |

*comparative

In Table 1 the following abbreviations are used:
Ex.=Example
dNCO=diisocyanate
IPDI=isophorone diisocyanate
HDI=1,6-hexamethylene diisocyanate
dOH=diol ii)
CL=polycaprolactone diol with MW about 1,000
AHN=polyester diol from 1,6-adipate, 1,6-hexanediol and neopentylglycol with MW about 1,000
PTG=poly(tetramethylene glycol) with MW about 1,000
NCO/OH=NCO/OH equivalent ratio
BA=blocking agent
DMP=3,5-dimethyl pyrazole
MEKO=2-butanone oxime
D/M=3,5-dimethyl pyrazole/2-butanone oxime, 50/50 in mol
% NCOb=% of NCO blocked (based on total —NCO of the intermediate)
DIPA=di-isopropylamine
DBA=di-n-butylamine
DEA=diethanolamine
MR=monofunctional reactant (DIPA, DBA or DEA)
% NCOr=% of NCO reacted with the monofunctional reactant (based on total —NCO of the intermediate)
% NCOf=% of free NCO after step b. (based on total —NCO of the
intermediate)

Preparation of the Inkjet Inks and Evaluation of their Performances

Thirteen aqueous inkjet inks (Ink 1 to Ink 13) having the composition reported in Table 2 were prepared.

The viscosity of the inks were measured by a Physica MCR101 concentric cylinder rheometer (Anton Paar) at 25° C. They all showed Newtonian behaviour.

The stability of the inkjet inks was evaluated by visual examination of their homogeneity after storage at 50° C. for 14 days.

The washability of the inks was qualitatively evaluated as follows: 3-4 threads of drops of ink are deposited on a Petri glass with a syringe and the glass is stored in an oven at 50° C. overnight. The glass is put under draught water and if complete removal of the ink is observed it is supposed that the ink will not leave undesired resistant residues on the printing machine, nor clog its nozzles.

The viscosity, stability and washability results are reported in Table 3.

In Table 3, "good" means that no sediment formation is visually observed, or a sediment is formed but can be re-dispersed immediately by stirring.

In Table 3, "+++" and "++" mean that the ink is completely washed away by draught water (respectively more or less quickly), "no" means that a film persists on the glass.

The performance of the inkjet inks was further evaluated after printing.

The inkjet inks were applied on cotton fabrics and dried for two minutes at 165° C.

The wet rub fastness and the dry rub fastness were tested according to UNI standard method EN 105-X12 (1997) and to ISO 105-A03 standard method (1993), that describes the grey scale for determining staining of adjacent fabrics in colour fastness tests.

ISO 105-A02 (1993) standard method, that describes the grey scale for determining changes in colour of textiles in colour fastness tests was used to evaluate the washing resistance, i.e. the colour fastness after washing (home washing mashing, 60° C. for 1 hour).

The results are also reported in Table 3.

TABLE 2

| Ingredients of the ink | % by weight |
|------------------------|-------------|
| Glycerin | 10 |
| Methoxypropylene glycol | 13 |
| Example 1-13[1)] | 25 |
| Millbase[2)] | 52 |

[1)]if needed, the concentration of the binder is adjusted to 29.6 wt %, to provide an ink containing 7.4 wt % of binder
[2)]Waterbased millbase containing 11.5 wt % of organic pigment

TABLE 3

| Ink | Viscosity (mP*s) | Stability | Washability | Dry rub fastness | Wet rub fastness | Washing resistance |
|-----|------------------|-----------|-------------|------------------|------------------|--------------------|
| 1   | 5.1 | good | +++ | 2/3 | 3/4 | 4/5 |
| 2*  | 5.2 | good | +++ | 1   | 1/2 | 3/4 |
| 3   | 5.1 | good | +++ | 2   | 2/3 | 4   |
| 4   | 5.0 | good | +++ | 2/3 | 3   | 4/5 |
| 5   | 5.2 | good | +++ | 2   | 2   | 4   |
| 6   | 5.2 | good | +++ | 2   | 2   | 4   |
| 7   | 4.9 | good | +++ | 2   | 3   | 4/5 |
| 8   | 5.2 | good | +++ | 2/3 | 3/4 | 4/5 |
| 9*  | 5.9 | good | no  | 3   | 3/4 | 4/5 |
| 10  | 4.8 | good | ++  | 3   | 4   | 4/5 |
| 11  | 5.5 | good | ++  | 3   | 4   | 4/5 |
| 12  | 4.9 | good | +++ | 2/3 | 3   | 4/5 |
| 13  | 5.2 | good | +++ | 2   | 3/4 | 4/5 |

*comparative

The invention claimed is:

1. An aqueous inkjet ink comprising dispersed pigments and a binder which is a carboxylated polyurethane having blocked isocyanate groups obtained by a process comprising the following steps:
   a. reacting
   i) at least one aliphatic or cycloaliphatic diisocyanate,
   ii) at least one diol having a hydroxyl number and having molecular weight from 500 to 5,000 daltons selected in the group consisting of polyether diols, polyester diols, polycarbonate diols, polyesteramide diols, polythioether diols, polyacetal diols, polyvinyl diols and polysiloxane diols, wherein the molecular weight is determined from the hydroxyl number of the diol,
   iii) at least one diol having a carboxylic acid group,
   the diisocyanate of i) having —NCO groups and the diols of ii) and iii) having OH groups, the —NCO groups and OH groups having a molar ratio, wherein the molar ratio between the —NCO groups of the diisocyanate and the OH groups of the diols being between 1.2 and 2, to form a —NCO terminated intermediate;

b. reacting the —NCO terminated intermediate with one or more —NCO blocking agent selected in the group consisting of triazoles, pyrazoles, oximes and lactames, and, optionally, with a monofunctional alcohol or with a primary or secondary monoamine or with a mixture thereof, to obtain a carboxylated polyurethane having blocked isocyanate groups;

c. optionally dispersing the carboxylated polyurethane having blocked isocyanate groups in water at concentration between 15 and 60% by weight.

2. The aqueous inkjet ink according to claim 1 in which in step b. at least 40% of the —NCO groups of the —NCO terminated intermediate are reacted with the blocking agent and up to 60% of the —NCO groups of the —NCO terminated intermediate are reacted with a monofunctional alcohol or with a primary or secondary monoamine or with a mixture thereof.

3. The aqueous inkjet ink according to claim 2 in which in step b. at least 70% of the —NCO groups of the —NCO terminated intermediate are reacted with the blocking agent or with both the blocking agent and the monofunctional alcohol, the primary or secondary monoamine or the mixture thereof.

4. The aqueous inkjet ink according to claim 3 in which in step b. 100% of the —NCO groups of the —NCO terminated intermediate are reacted with the blocking agent or with both the blocking agent and the monofunctional alcohol, the primary or secondary monoamine or the mixture thereof.

5. The aqueous inkjet ink according to claim 1 in which the pigments are organic pigments and/or carbon black.

6. The aqueous inkjet ink according to claim 5 containing from 2 to 10% by weight of organic pigments and/or carbon black.

7. The aqueous inkjet ink according to claim 6 in which the weight ratio between the binder and the pigment is comprised between 0.3 and 3.

8. The aqueous inkjet ink according to claim 7 having viscosity from 3 to 15 mPa*s, as measured with a concentric cylinder rheometer at 25° C.

9. The aqueous inkjet ink according to claim 1 comprising from 50% to 90% of water and up to 40% by weight of a water-miscible organic solvent.

10. The aqueous inkjet ink according to claim 1 in which the diol ii) is selected in the group consisting of polyether diols, polyester diols, and polycarbonate diols.

11. The aqueous inkjet ink according to claim 1 in which the diol iii) having a carboxylic acid group is dimethylolpropionic acid or dimethylolbutanoic acid.

12. The aqueous inkjet ink according to claim 1 in which the aliphatic or cycloaliphatic diisocyanate is 1,6-hexamethylene diisocyanate or isophorone diisocyanate.

13. The aqueous inkjet ink according to claim 1 in which the blocking agent is selected in the group consisting of pyrazoles, oximes and mixture thereof.

14. A method for printing textiles by inkjet printing that comprises the following steps:

i. one or more aqueous inkjet ink comprising dispersed pigments and a binder which is a carboxylated polyurethane having blocked isocyanate groups are prepared by a process comprising the following steps:
a. reacting 1) at least one aliphatic or cycloaliphatic diisocyanate,
2) at least one diol having a hydroxyl number and having molecular weight from 500 to 5,000 daltons selected in the group consisting of polyether diols, polyester diols, polycarbonate diols, polyesteramide diols, polythioether diols, polyacetal diols, polyvinyl diols and polysiloxane diols, wherein the molecular weight is determined from the hydroxyl number of the diol,
3) at least one diol having a carboxylic acid group, the diisocyanate of i) having —NCO groups and the diols of ii) and iii) having OH groups, the —NCO groups and OH groups having a molar ratio, wherein the molar ratio between the —NCO groups of the diisocyanate and the OH groups of the diols being between 1.2 and 2, to form a —NCO terminated intermediate;

b. reacting the —NCO terminated intermediate with one or more —NCO blocking agent selected in the group consisting of triazoles, pyrazoles, oximes and lactames, and, optionally, with a monofunctional alcohol or with a primary or secondary monoamine or with a mixture thereof, to obtain a carboxylated polyurethane having blocked isocyanate groups;

c. optionally dispersing the carboxylated polyurethane having blocked isocyanate groups in water at concentration between 15 and 60% by weight;

ii. the one or more of the aqueous inkjet ink obtained in step i) are jetted onto a textile substrate by an inkjet printer; and iii. the textile substrate is heated at temperatures from 120° C. to 170° C. for from 1 to 10 minutes.

15. The method for printing textiles by inkjet printing according to claim 14 in which in step b. at least 40% of the —NCO groups of the —NCO terminated intermediate are reacted with the blocking agent and up to 60% of the —NCO groups of the —NCO terminated intermediate are reacted with a monofunctional alcohol or with a primary or secondary monoamine or with a mixture thereof.

16. The method for printing textiles by inkjet printing according to claim 15 in which in step b. at least 70% of the —NCO groups of the —NCO terminated intermediate are reacted with the blocking agent or with both the blocking agent and the monofunctional alcohol, the primary or secondary monoamine or the mixture thereof.

17. The method for printing textiles by inkjet printing according to claim 16 in which in step b. 100% of the —NCO groups of the —NCO terminated intermediate are reacted with the blocking agent or with both the blocking agent and the monofunctional alcohol, the primary or secondary monoamine or the mixture thereof.

18. The method for printing textiles by inkjet printing according to claim 14 in which the pigments are organic pigments and/or carbon black.

19. The method for printing textiles by inkjet printing according to claim 14 in which the one or more aqueous inkjet ink has a viscosity from 3 to 15 mPa*s, as measured with a concentric cylinder rheometer at 25° C.

20. The method for printing textiles by inkjet printing according to claim 14 in which the blocking agent is selected in the group consisting of pyrazoles, oximes and mixture thereof.

* * * * *